May 13, 1930.  W. RIEHM  1,758,375

INTERNAL COMBUSTION ENGINE

Filed July 19, 1926

Inventor
Wilhelm Riehm
by Marechal & Jehu
attorneys.

Patented May 13, 1930

1,758,375

UNITED STATES PATENT OFFICE

WILHELM RIEHM, OF AUGSBURG, GERMANY, ASSIGNOR TO THE FIRM: MASCHINEN-FABRIK AUGSBURG-NUERNBERG, AKTIENGESELLSCHAFT, OF AUGSBURG, GERMANY

INTERNAL-COMBUSTION ENGINE

Application filed July 19, 1926, Serial No. 123,461, and in Germany July 20, 1925.

This invention relates to internal combustion engines operating with self-ignition and "solid" fuel injection, i. e. injection of the fuel by a pump without the use of air.

The use of heavy oils in such internal combustion engines still presents considerable difficulties. The reasons for this are (1) that efficient conversion into mist and distribution of the viscous, thick oil in the combustion air by means of the injection nozzle alone cannot be attained, and (2) heavy oils have a marked tendency to form coke in the hot injection nozzle which results in the injection conduits, even when they are relatively wide, becoming clogged after a short period of working and thus rendering the distribution of the injected fuel in the combustion air still worse.

According to the present invention in order to eliminate the above-mentioned drawbacks the injection nozzle is energetically cooled, and at the same time the incoming combustion air is caused to gyrate or whirl in a manner well known in itself. The cooling of the nozzle prevents coke from being formed in the nozzle openings and thus renders perfect injection possible, whilst the gyrating of whirling movement of the air assists simultaneously the action of the injection nozzle in the division or distribution of the fuel and its proper mixing with the combustion air, and moreover produces a scavenging or cooling of the injection nozzle. Experiments have shown that the combination of these two features ensures a very much better combustion of heavy oils in the engine, than is the case when these features are employed separately.

Figure 1:
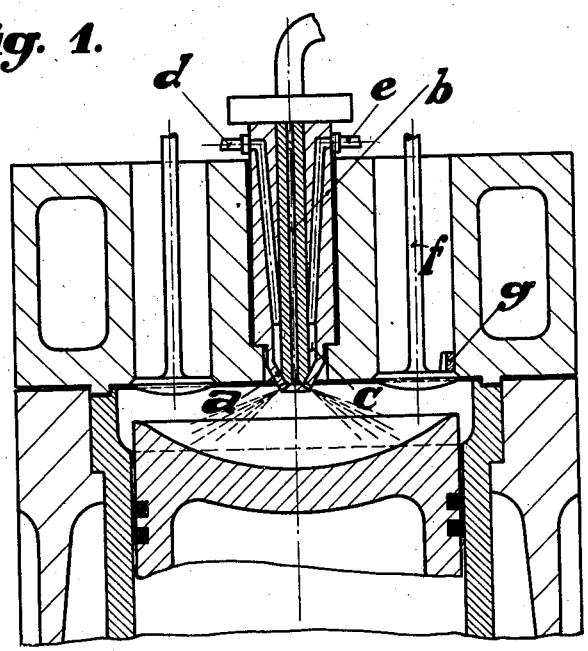
Figure 2:
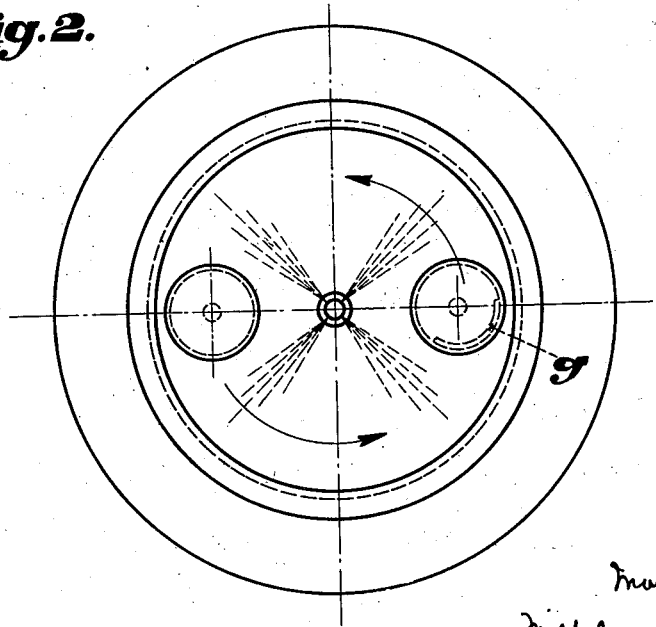

In order that the said invention may be clearly understood and readily carried into effect, the same will now be described more fully with reference to the accompanying drawings, in which:

Figure 1 is a vertical section through the engine cylinder showing a constructional form of my improvements, and Figure 2 is a bottom view of the cylinder cover of Figure 1.

The injection nozzle $a$ with the supply conduit $b$ for the fuel is provided in the lower portion near the combustion chamber, with a cooling chamber $c$ into which open the supply pipe $d$ and the discharge pipe $e$ for the cooling medium. This cooling chamber extends as far down as possible so as to ensure the best possible cooling of the injection nozzle openings. The injection conduit $b$ is however protected from excessive cooling of the fuel, by making its walls of suitable thickness.

The air inlet valve $f$ is provided laterally with a screen or deflector $g$ which in the well known manner imparts a gyrating or whirling motion to the incoming combustion air. This gyrating or whirling motion could be obtained by other means known for the purpose.

Having now particularly described and ascertained the nature of my said invention and in what manner the same is to be performed, I declare that what I claim is:

In an internal combustion engine of the character described operating with solid fuel injection and self-ignition, and in combination, a cylinder, a piston therein, said parts forming a combustion space, a fuel injection nozzle having a tip provided with a fuel injection opening positioned to inject fuel into said combustion space and having a fuel conduit therein, said nozzle having means for circulating a cooling fluid adjacent said nozzle tip to cool the tip without excessively cooling said fuel conduit and the fuel passing therethrough, and means for introducing combustion air into said combustion space in a manner to sweep over the cooled tip of said fuel injection nozzle.

In testimony whereof I have affixed signature.

Dr. WILHELM RIEHM.